US005263524A

United States Patent [19]

Boardman

[11] Patent Number: 5,263,524

[45] Date of Patent: Nov. 23, 1993

[54] TRAILER DETECTION CONTROL FOR VEHICLE CENTRAL TIRE INFLATION SYSTEM

[75] Inventor: Mark D. Boardman, Portage, Mich.

[73] Assignee: Eaton Corporation, Eaton Center

[21] Appl. No.: 996,946

[22] Filed: Dec. 28, 1992

[51] Int. Cl.[5] .................... B60C 23/00

[52] U.S. Cl. .................... 152/416; 73/146.2; 340/442; 340/431

[58] Field of Search .................... 152/415, 416; 73/146.2; 340/442, 425.5, 431, 438, 687

[56] References Cited

U.S. PATENT DOCUMENTS

| | | | |
|---|---|---|---|
| 3,878,376 | 4/1975 | Sholes, Jr. et al. | 364/509 |
| 4,313,483 | 2/1982 | Brockmann | 152/416 |
| 4,418,737 | 12/1983 | Goodell et al. | 152/416 |
| 4,470,506 | 9/1984 | Goodell et al. | 206/223 |
| 4,529,961 | 7/1985 | Nishimura et al. | 340/447 |
| 4,550,385 | 10/1985 | Pulk et al. | 364/558 |
| 4,583,566 | 4/1986 | Kalavitz et al. | 137/101.19 |
| 4,744,399 | 5/1988 | Magnuson et al. | 152/417 |
| 4,860,579 | 8/1989 | Beverly | 73/146.2 |
| 4,876,528 | 10/1989 | Walker et al. | 340/442 |

*Primary Examiner*—Michael W. Ball
*Assistant Examiner*—Francis J. Lorin
*Attorney, Agent, or Firm*—P. S. Rulon

[57] ABSTRACT

A vehicle central tire inflation system (10), which checks and inflates/deflates tires of an automotive tractor and trailer, is provided with a prevention control (110) for preventing inflation/deflation operation of the system (10) when the tractor is disconnected from the trailer.

8 Claims, 2 Drawing Sheets

FIG I

TRAILER DETECTION CONTROL FOR VEHICLE CENTRAL TIRE INFLATION SYSTEM

FIELD OF THE INVENTION

The present invention relates to central tire inflation systems (CTI Systems or CTIS), also known as on-board inflation systems or traction systems. Such systems monitor and vary tire pressure from a remote location on the vehicle while the vehicle is at rest and/or in motion. This invention is particularly concerned with a CTIS inflation control for an articulated vehicle such as a tractor and trailer.

DESCRIPTION OF THE PRIOR ART

Central tire inflation systems are well known in the prior art as may be seen by reference to U.S. Pat. Nos. 4,640,331; 4,678,017; 4,754,792; 4,782,879; 4,804,027; 4,883,106; 4,898,216; 4,922,946; 4,924,926; 5,174,839; and published European Patent Applications 0,297,837; 0,352,921; and U.S. patent application Ser. Nos. 753,526 filed Sep. 3, 1991 and 792,552 filed Nov. 15, 1991 now U.S. Pat. No. 5,180,456. The disclosures of these patents and applications are incorporated herein by reference.

It is known to provide a vehicle on-board CTI System with a control circuit which activates a tire pressure check mode by momentarily connecting a source of pressurized air to a manifold/conduit for pneumatically opening a wheel valve(s) interposed between the manifold/conduit and a tire chamber(s), by allowing the manifold/conduit and tire chamber(s) pressure to equalize, by sensing the manifold air pressure and then activating a tire pressure inflation mode for increasing the tire pressure by again connecting the air source to the manifold/conduit if the sensed pressure is less than a demand tire pressure or activating a tire pressure deflation mode for decreasing the tire pressure by connecting the tire chamber(s) to a vent if the sensed pressure is greater than the demand tire pressure. Such a control circuit provides satisfactory results when the manifold/conduit always has a known volume and/or if the wheel valve(s) are always connected to the manifold. Such is not the case in a CTI System having a wheel valve(s) associated with tires on a trailer which may be disconnected from a tow vehicle such as an automotive tractor. In such a case the portion of the manifold/conduit to the trailer is disconnected with the trailer. If the disconnected portion is left open the pressure check will always sense a pressure too low. If the disconnected portion is closed, the pressure check will first sense a pressure too high and then alternately activate the deflation and inflation modes in response to the deflation and inflation modes respectively causing the manifold pressure to go low and then high.

SUMMARY OF THE INVENTION

An object of this invention is to provide a CTIS control with means for pneumatically detecting if a trailer is disconnected from a tow vehicle and then prevent activation inflation and deflation modes of the control in response to such detecting.

According to a feature of the invention a tow vehicle and a trailer are selectively attached to and detached from each other. The vehicle and trailer each include rotatably mounted tire assemblies having tire chambers and an on-board tire pressure control system comprising: An air source mounted on the vehicle and providing pressurized air at a pressure greater than normally maximum tire chamber pressure. A wheel valve includes an outlet port continuously communicating with a tire chamber of at least one of the trailer tire assemblies, an inlet port and a valving means movable between positions blocking and unblocking air communication between the ports in response to an absence and a presence of pressurized air at the inlet port. First conduit means mounted on the vehicle has a predetermined volume for passage of air therethrough. First valve means mounted on the vehicle allows and blocks flow of the air source pressurized air to a first end of the first conduit means in response to receiving open and closed signals, respectively. Second conduit means mounted on the trailer has a predetermined volume for passage of air therethrough and has a first end connected to the wheel valve inlet port. A disconnect valve includes first and second parts respectively affixed to a second end of the first and second conduit means. The first and second parts are operative when connected together to fluidly interconnect the volumes of the first and second conduit means, and when disconnected, the first part is operative to block the second end of the first conduit means. Sensing means provide pressure signals representive of air pressure in the first conduit means. A control circuit includes means operative to activate a pressure check mode of the tire chamber pressure by applying a momentary open signal to the first valve means to effect the presence of a predetermined pressure level of pressurized air at the wheel valve inlet port to effect movement of the valving means to the unblocking position, thereby allowing air pressure in the first and second conduit means to equalize with the tire chamber pressure. The control circuit then activates inflation or deflation modes respectively in response to a pressure signal from the sensing means indicating a tire chamber pressure less than or greater than a preselected tire pressure. The inflation mode connects the air source with the tire chamber to increase tire chamber pressure and the deflation mode connects the tire chamber to a vent to decrease tire chamber pressure.

The control circuit further includes inflation and deflation mode prevention means. The prevention means includes means for applying the open signal to the first valve means for a predetermined time period sufficient to effect a first manifold pressure in the first conduit means when of the first and second parts of the disconnect valve are connected and a second manifold pressure when the first and second parts of the disconnect valve are disconnected. Stop means prevent the inflation and deflation modes in response to the pressure signal from the sensing means indicating the second pressure.

BRIEF DESCRIPTION OF THE DRAWINGS

The CTI System of the present invention is shown in the accompanying drawings in which.

DETAILED DESCRIPTION OF THE DRAWINGS

Figure 1:
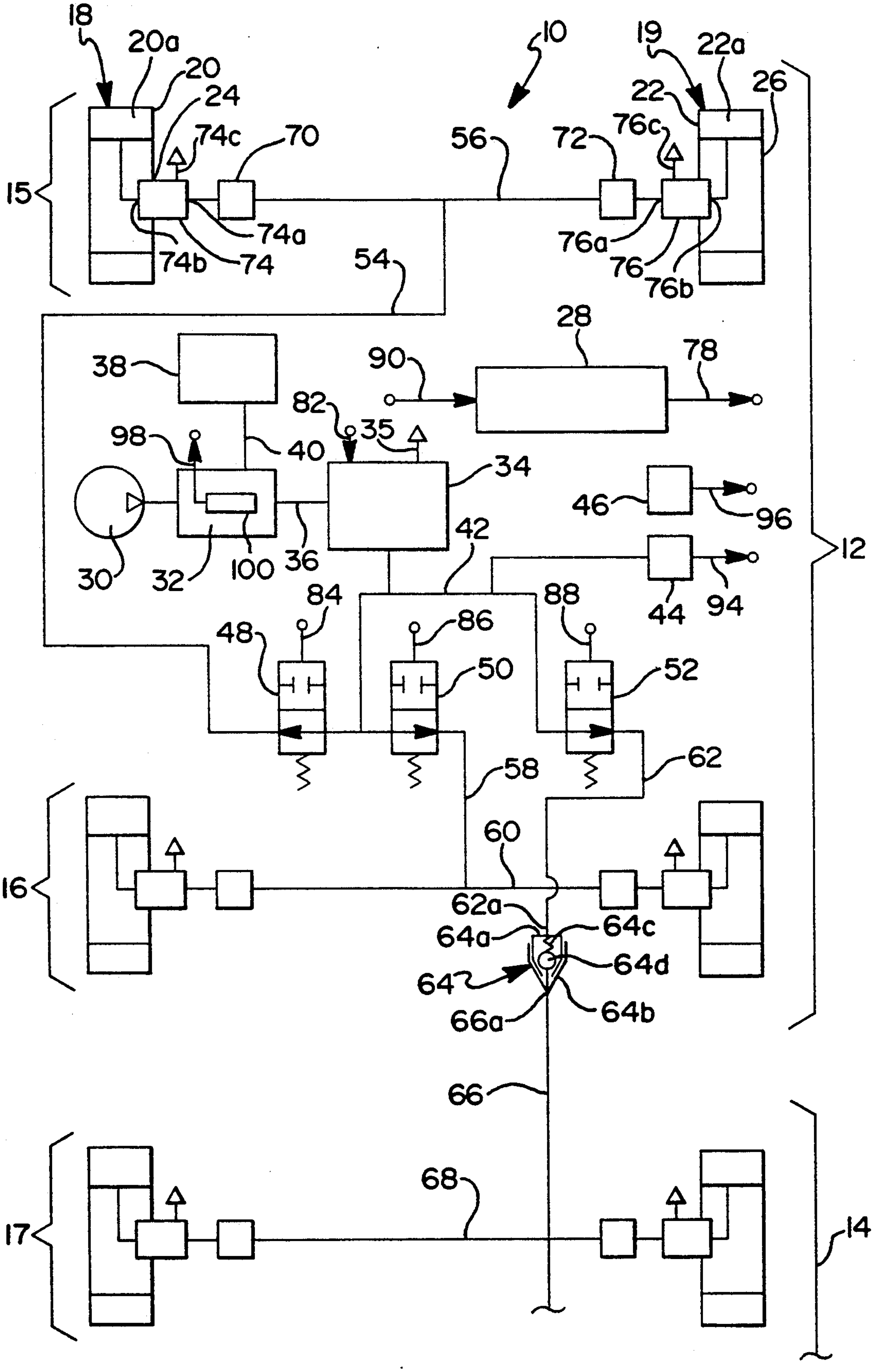
FIG. 1 is a schematic illustration of a tow vehicle and trailer, and an air system with electronic and wheel components.

The schematic of FIG. 1 illustrates a CTIS 10 for a tow vehicle such as an automotive tractor and trailer respectively represented by brackets 12,14. The trailer is selectively connectable to the tractor in known manner. The tractor steer and drive axles are represented by brackets 15,16, and one or more trailer axles are represented by bracket 17. CTIS components mounted on each axle are substantially the same in structure and/or function. Accordingly, only the components on axle 15 will be given reference numbers for brevity. The axles each include left and right wheel assemblies 18,19. The vehicle is preferably, but not necessarily, of the heavy duty truck type. The CTIS measures and controls the inflation/deflation pressure of tire chambers 20*a*,22*a* of tires 20,22 mounted on wheels 24,26 of the wheel assemblies 18,19. The CTIS herein controls tire pressure of groups of tires, e.g., all of the tires on steer axle 15 are controlled as a group, all of the tires on drive axle 16 are controlled as a group, and all of the tires on the trailer axle or axles 17 are controlled as a group. However, other grouping arrangements may be provided or individual tire control may be provided.

Figure 3:
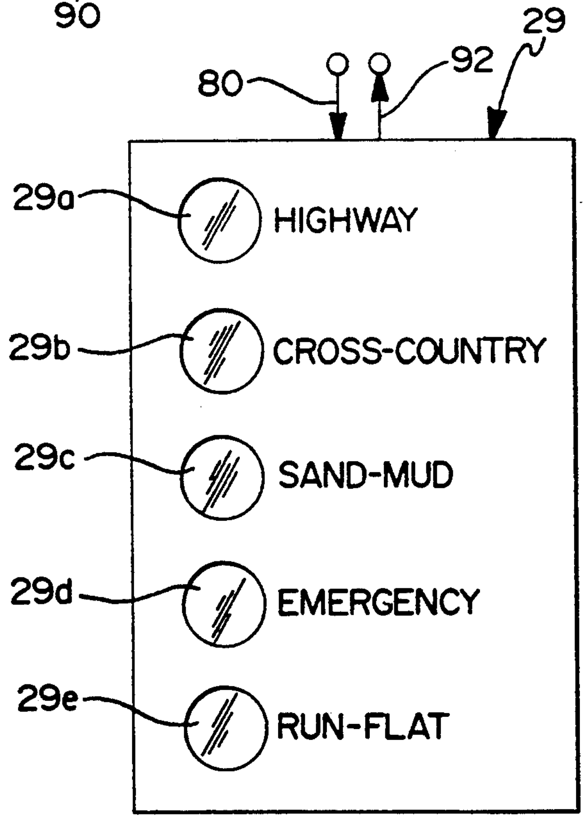
FIG. 3 is a schematic illustration of an operator control panel for changing demand or desired tire pressure.

The chassis mounted components include a control circuit having a microcontroller 28, a vehicle operator control panel 29 shown in FIG. 3, a source of pressurized air including a compressor 30 normally driven by the vehicle engine and an air tank 32 connected to a pneumatic control assembly 34 via a conduit 36 and to a vehicle brake system 38 via a conduit 40, a conduit assembly or a manifold 42, a manifold air pressure sensor 44, a vehicle speed sensor 46, a steer axle select valve 48, a drive axle select valve 50, and a trailer axle select valve 52. Valve 48 selectively connects and blocks air communication between manifold 42 and the steer axle components via conduits 54,56. Valve 50 selectively connects and blocks air communication between manifold 42 and the drive axle components via conduits 58,60. Valve 52 selectively connects and blocks air communication between manifold 42 and the trailer axle components via a conduit 62, a quick disconnect valve 64, and conduits 66,68. Any additional number of select valves may be provided for other axles. Alternatively, additional select valves may be provided to separately communicate the left and right tire chambers of each axle with manifold 42. The quick disconnect valve includes first and second parts 64*a*,64*b* respectively connected to ends 62*a*,66*a* of conduits 62,66. When the first and second parts are connected together as shown they fluidly interconnect the conduits 62,66. When they are disconnected, as they would be when the trailer is disconnected from the tractor, a spring 64*c* biases a check valve ball 64*d* against a valve seat to seal a block conduit end 62*a*.

Conduit 56 fluidly communicates with each tire chamber 20*a*,22*a* via rotary seal assemblies 70,72 and wheel valves 74,76. Examples of rotary seals may be seen by reference to previously mentioned U.S. Pat. Nos. 4,640,331; 4,804,027; 4,883,106 and 5,174,839. Each valve 74,76 includes an inlet port 74*a*,76*a* communicating with conduit 56 via the associated rotary seal and an outlet port 74*b*,76*b* communicating with the associated tire chamber. Preferably, each valve includes valving means for venting the associated tire volume to a vent or atmospheric opening 74*c*,76*c* in response to some form of command from microcontroller 28. The atmospheric opening may be at the wheel valve, as disclosed in previously mentioned U.S. Pat. Nos. 4,678,017; 4,782,879; 4,922,946 and U.S. patent application Ser. No. 753,526. Alternatively, the atmospheric opening may be remote from the wheel valve as disclosed in previously mentioned U.S. Pat. No. 4,640,331, therein the atmospheric opening is provided by a quick release valve positioned at the intersection of conduits such as conduits 54,56.

Wheel valves 74,76 contemplated for use in the CTIS embodiment herein block air communication between the tire chambers 20*a*,22*a* and the associated valve inlet ports 74*a*,76*a* and atmospheric vents 74*c*,76*c* when air pressure at the inlet is substantially at atmospheric pressure. When the air pressure at inlet ports 74*a*,76*a* are a predetermined pressure above atmospheric pressure, unshown valving means in each wheel valve moves to allow fluid communication of the tire chambers with conduit 56. When the air pressure at the inlet ports 74*a*,76*a* are a predetermined pressure less (vacuum) than atmospheric pressure, the valving means blocks the inlet port and allows fluid communication of the tire chamber with the associated atmospheric vents 74*c*,76*c*. Alternatively, the CTIS may be provided with wheel valves which are closed when air pressure at the inlets is substantially equal to atmospheric pressure, open for inflating the tires when the inlet air pressure is above a first predetermined minimum, and in a vent position when the inlet pressure is between the predetermined pressure and atmospheric pressure.

Microcontroller 28 includes a programmed microprocessor device/devices for processing and issuing command output signals via an output wiring harness 78. Harness 78 is connected to control panel 29 via a wiring harness 80, to pneumatic controller assembly 34 via a wiring harness 82 and to select valves 48,50,52 via conductors 84,86,88. The output signals are generated in accordance with known logic rules and in response to input signals received via an input wiring harness 90. Details of programming such microprocessor devices are known and rather straightforward given a flow diagram for the program. Input harness 90 receives signals from control panel 29 via a wiring harness 92, manifold pressure signals for pressure sensor 44 via a conductor 94, vehicle speed signals from speed sensor 46 via a conductor 96, and an air source pressure signal from a conductor 98 connected to a pressure sensor 100 on air tank 32. Microcontroller 28 renders the CTIS inoperative whenever the air source pressure signal from sensor 100 indicates that the air source pressure is less than a minimum needed for safe operation of the vehicle brakes. As is known in the art, CTIS microcontroller 28 is programmed to issue a tire pressure check sequence command or mode at vehicle start-up and automatically periodically during vehicle operation. If the pressure check mode indicates that current tire pressure $P_c$ of any group of tires is greater than or less than a demand pressure $P_D$, the controller issues either a deflate or inflate mode command for the group or groups requiring pressure correction.

Operator control panel 29, as shown herein, includes light emitting push switches 29*a*,29*b*,29*c*,29*d*,29*e* respectively labeled "Highway", "Cross-Country", "Sand-Mud", "Emergency", and "Run Flat". Of course more or fewer switches may be provided. Additional detail concerning panel 29 may be seen by reference to U.S. Pat. No. 4,754,792 and published European Patent Application 0,297,837. Switches 29*a* through 29*d* instruct the microcontroller to maintain the vehicle tires at a demand pressure $P_D$ corresponding to the labeled type operation of switches 29a–29d. For example, activation of switch 29a corresponds a tire pressure of 3.02 bar (45 psi), switch 29b corresponds to a pressure of 2.35 bar (35 psi), switch 29c corresponds to a pressure of 1.68 bar (25 psi), and switch 29d corresponds to a pressure of 0.8 bar (12 psi). The microcontroller may be programmed to override the reduced pressure setting of switches 29b,29c,29d when the vehicle exceeds a predetermined speed, e.g. 65 Km/hr (40 MPH). Activation of Run-Flat switch 29e instructs the microcontroller to increase the pressure check frequency and to maintain tire pressure corresponding to which switch 29a–29d is activated.

Details of pneumatic control assembly 34 may be seen by reference to previously mentioned U.S. application Ser. No. 792,552. Herein it should suffice to say that electrical signals on wiring harness 82 from microprocessor 28 energize unshown control valves for selectively connecting manifold 42 to positive air pressure in tank 32 via conduit 36 or to negative (vacuum) air pressure from an unshown vacuum source, or to an atmosphere vent 35. When control assembly 34 connects manifold 42 to atmosphere vent 35, the rotary seals 70,72 and the wheel valve inlet ports 74a,76a are connected to vent 35 while the corresponding select valve is in the open position, thereby relieving the rotary seal of the deteriorating affects of the positive pressure and also effecting closing of the wheel valves.

CTIS 10 automatically maintains tire pressure at or near demand pressure $P_D$ selected by control panel 29 in accordance with microcontroller programming. The vehicle operator has the capability of commanding the system to decrease or increase tire pressure for improving tire traction or increasing load carrying capacity of the vehicle by merely activating the appropriate control panel switch. The system automatically increases tire pressure if the vehicle speed, as monitored by speed sensor 46, exceeds a predetermined speed for the selected tire pressure.

When the vehicle ignition is energized and pressure switch 100 is closed, controller 28 initiates a pressure check sequence of the tires on each of the axle assemblies. If tire pressure of any of the axles is found to be a predetermined amount less than demand pressure, an inflation/deflation mode is initiated for the tires on the axle or axles affected. During vehicle operation, the microcontroller automatically initiates periodic pressure check modes. When enhanced or maximum traction is required, the vehicle operator may command reduced tire pressure by pushing the appropriate switches on control panel 29; if the vehicle speed is greater than a predetermined amount for the selected reduced pressure, the microcontroller will not initiate the pressure reduction.

The specific order and details of CTIS pressure check/inflate/deflate modes may vary substantially depending details of system components, type of vehicle, vehicle intended use, etc. Herein, by way of example only, the microprocessor is programmed to first sequentially conduct a pressure check mode of the group of tires on each of the axles. If the pressure check indicates that one or more groups of tires is not within pressure demand limits, the microprocessor then initiates inflate or deflate modes to bring the tire group or groups within limits. The tire group most out of limits are attended to first by initiating an inflate or deflate sequence for a time period proportional to the amount the pressure is out of limits. A pressure check of this tire group is then performed. If the check indicates this group is still more out of limits than any of the other groups, the inflate or deflate mode is repeated. If the check indicates another group or groups are now more out of limits, those groups are then attended to on the above priority basis until all tire groups are within limits.

Also by way of example, a pressure check mode of the tire group of steer axle 15 by microcontroller 28 is initiated by energizing select valves 50,52 to their closed positions and connecting manifold 42 to conduit 36 via control assembly 34 for a predetermined time period suffice for the pressure in manifold 42 and conduits 54,56 to potentially exceed maximum normal tire pressure, thereby moving the unshown valving means in wheel valves 74,76 associated with axle 15 to positions respectively intercommunicating the inlet and outlet modes thereof. With the wheel valves open and the conduit 36 blocked by control assembly 34, the air pressure in manifold 42 and conduits 54,56 soon equalizes to tire pressure. For the CTIS disclosed herein with manifold 42 and conduits 54,56 having a given air volume and with the air pressure in tank 32 being above the minimum for safe brake operation, a predetermined pressure check time period of about one and one-half seconds provides satisfactory results. A short time after the predetermined tire period, e.g., about forty-five seconds, microprocessor 28 reads the pressure in manifold 42 via signals from pressure sensor 44 and subsequently initiates an inflate or deflate mode based on the previously mentioned priority basis if the pressure is above or below the demand pressure limits. Pressure check modes for the tire groups of axles 16 and 17 are conducted in analogous manner with the exception that the microcontroller checks to determine if the trailer is disconnected as explained further hereinafter.

A tire inflation mode is initiated for axle assembly 15 by energizing valve 50,52 to their closed positions and connecting manifold 42 to air source 32 via conduit 36 for a time period based on the amount the tires are out of demand pressure limits as previously mentioned. The inflation mode is terminated by microcontroller applying a close signal to controller 34 to disconnect manifold 42 from the air source.

A tire deflation mode is initiated for axle assembly 15 by energizing valves 48,50,52 to their closed positions and energizing the unshown vacuum source in control assembly 34 to provide a negative air pressure in manifold 42. Adequate vacuum sensed at pressure sensor 44 causes microcontroller 28 to de-energize valve 48, thereby creating negative pressure in conduits 54,56 and at inlets 74a,76a for moving the wheel valve valving means to positions connecting outlets 74b,76b to vents 74c,76c shown in FIG. 1. The deflation mode is terminated by de-energizing the vacuum source. Further details of a tire inflation and deflation modes may be seen by reference to published European Patent Application 0,352,921.

With the CTIS as thus far described, when quick disconnect 64 is disconnected, as it would be when trailer 14 is disconnected from tractor 12, the pressure check falsely indicates that the tire groups of trailer axle 17 are above pressure demand limits. This is due to conduit 62 being blocked or dead ended by check ball 64d in quick disconnect part 64a, thereby substantially reducing the manifold and conduit air volume to the trailer. When such a false high pressure reading is indicated, microcontroller 28 initiates a deflate sequence for axle 17 for the previously mentioned time period proportional to the amount the pressure is out of limits. This, of course, rapidly depletes the pressure in the relatively small air volume of manifold 42 and conduit 62. The next pressure reading then indicating a low pressure, whereby the microcontroller then initiates an inflate sequence which causes the air pressure to go high again. This inflate/deflate cycling is, of course, unsatisfactory.

Herein, such cycling is prevented by pneumatically checking to determine if the trailer is connected. If the check indicates the trailer is disconnected, the microprocessor may delete pressure check modes for the trailer axle for a certain time period or, as preferred herein, delete inflate/deflate modes until a pressure check mode or trailer connect test indicates that a trailer is now connected.

Figure 2:
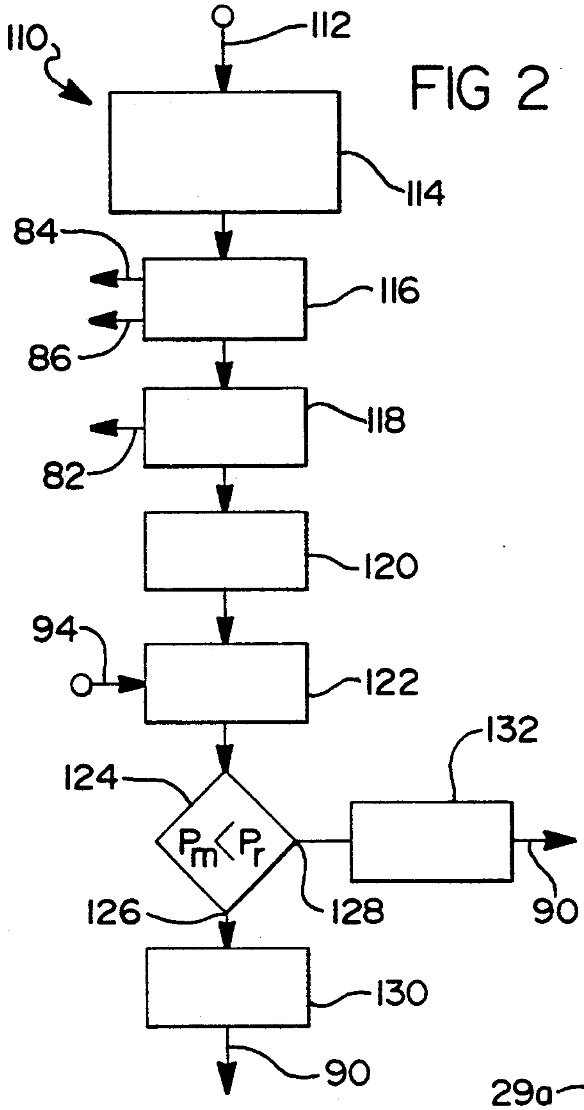
FIG. 2 is a schematic illustration of an embodiment of a control circuit portion of the CTIS for preventing inflation and deflation modes of operation of CTIS when the tow vehicle and trailer are disconnected.

Looking now mainly at FIG. 2, therein is schematically shown a trailer detection control 110 for pneumatically detecting whether a trailer is connected or disconnected by testing pressure in manifold 42 with and without disconnect valve 64 connected. Control 110 function may be provided by individual components, as shown herein, or be provided by known programming methods of microprocessor 28. Control 110 is activated in response to the microprocessor applying a start signal to an input 112 for activating a device 114 which then initiates a perform trailer connect check by activating a device 116 for applying electrical power to conductors 84,86 to close select valves 48,50. The start signal precedes initiation of pressure check modes for trailer axle 17. Device 116 then activates a timer device 118 for applying electrical power to wiring harness 82 of control assembly 34 for connecting manifold 42 to the pressurized air source via conduit 36 for 40 ms. At the end of the 40 ms time period device 118 activates another timer 120 which waits 20 ms and then activates a device 122 for reading manifold air pressure $P_m$ provided by pressure sensor conductor 94. A $P_m<P_r$ comparator device 124 receives the manifold pressure signal and then applies an output signal on a yes terminal 126 if manifold air pressure $P_m$ is less than a reference pressure $P_r$. If $P_m$ is greater than $P_r$, device 124 applies an output on a no terminal 128. Reference pressure $P_r$ is selected to be greater than the pressure rise that will occur in the air volume of manifold 42 and conduits 62,66,68 in response to receiving pressurized air from conduit 36 for 40 ms, i.e., manifold pressure $P_m$ will be less than reference pressure $P_r$ when quick disconnect 64 couples conduits 62,66. Conversely, $P_m$ will be greater than $P_r$ when quick disconnect 64 is uncoupled. The signal on the yes terminal activates a device 130 for initiating a pressure check mode for trailer axle 17 by the microcontroller in a manner previously described. A signal on the no terminal activates a device 132 for aborting trailer axle inflate and deflate modes. The start signal is preferably applied to input 112 when the vehicle ignition is energized, during the periodic pressure check modes and when tire pressure demand from control panel 29 is changed.

Alternatively, only devices 124,130,132 may be physically and/or functionally interposed into the pressure check sequence with function of comparator device 124 is changed to $P_r<P_m$ and with a longer momentary connection of the air source to manifold 42 and the conduits leading to trailer axle 17. For example, the longer momentary connection may be the one and one-half second time period of the pressure check mode. This relatively long time will cause the manifold pressure to approach air source pressure and therefore exceed normally maximum tire pressure. Hence, if $P_m$ exceeds $P_r$, device 132 is activated.

A preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A tow vehicle and trailer selectively attached to and detached from each other, the vehicle and trailer each including rotatably mounted tire assemblies having tire chambers, and an on-board tire pressure control system comprising:

an air source mounted on the vehicle and providing pressurized air at a pressure greater than normally maximum tire chamber pressure;

a wheel valve including an outlet port continuously communicating with a tire chamber of at least one of the trailer tire assemblies, an inlet port and a valving means movable between positions blocking and unblocking air communication between the ports in response to an absence and a presence of pressurized air at the inlet port;

first conduit means mounted on the vehicle and having a predetermined volume for passage of air therethrough;

first valve means mounted on the vehicle for allowing and blocking flow of the air source pressurized air to a first end of the first conduit means in response to receiving open and closed signals, respectively;

second conduit means mounted on the trailer and having a predetermined volume for passage of air therethrough, and having a first end connected to the wheel valve inlet port;

a disconnect valve including first and second parts respectively affixed to a second end of the first and second conduit means, the first and second parts operative when connected together to fluidly interconnect the volumes of the first and second conduit means, and when disconnected, the first part operative to block the second end of the first conduit means;

sensing means providing pressure signals representive of air pressure in the first conduit means;

a control circuit including means operative to activate a pressure check mode of the tire chamber pressure including applying a momentary open signal to the first valve means to effect the presence of a predetermined pressure level of pressurized air at the wheel valve inlet port to effect movement of the valving means to the unblocking position and thereby allowing air pressure in the first and second conduit means to equalize with the tire chamber pressure, activating inflation or deflation modes respectively in response to a pressure signal from the sensing means indicating a tire chamber pressure less than or greater than a preselected tire pressure, the inflation mode for connecting the air source with the tire chamber to increase tire chamber pressure and the deflation mode for connecting the tire chamber to a vent to decrease tire chamber pressure; and the control circuit further including inflation and deflation mode prevention means, said prevention means including means for applying a timed open signal to the first valve means for a predetermined time period sufficient to effect a first manifold pressure in the first conduit means when both of the first and second parts of the disconnect valve are connected and to effect a second manifold pressure when the first and second parts of the disconnect valve are disconnected wherein the first manifold pressure is different from the second manifold pressure, and stop means for preventing the activation of inflation and deflation modes for the trailer tire chamber in response to the pressure signal from the sensing means indicating the presence of the second pressure in the manifold.

2. The pressure control system of claim 1, wherein: the predetermined time period of the timed open signal is of such time period that the second manifold pressure will be more than a reference pressure.

3. The pressure control system of claim 1, wherein: the predetermined time period of the timed open signal is of such time period that the second manifold pressure will be greater than a reference pressure and greater than the normally maximum tire pressure.

4. The pressure control system of claim 1, wherein: said prevention means is activated by the pressure check mode.

5. The pressure control system of claim 1, wherein: said prevention means is automatically activated by the control circuit prior to each pressure check mode.

6. The pressure control system of claim 2, wherein: said prevention means is activated by the pressure check mode.

7. The pressure control system of claim 1, wherein: said stop means is activated in response to the second pressure signal indicating the second pressure is a predetermined pressure greater than normally maximum tire chamber pressure.

8. The pressure control system of claim 7, wherein: said predetermined time period of the timed open signal is the time period of the momentary open signal.

* * * * *